United States Patent
Fashchik et al.

(10) Patent No.: US 10,725,877 B2
(45) Date of Patent: Jul. 28, 2020

(54) SYSTEM, METHOD AND COMPUTER PROGRAM PRODUCT FOR PERFORMING A DATA PROTECTION OPERATION

(75) Inventors: Ran Fashchik, Yokneam Ilit (IL); Eyal Gordon, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 3978 days.

(21) Appl. No.: 12/164,446

(22) Filed: Jun. 30, 2008

(65) Prior Publication Data

US 2009/0328229 A1    Dec. 31, 2009

(51) Int. Cl.
*G06F 11/20* (2006.01)

(52) U.S. Cl.
CPC .............................. *G06F 11/2056* (2013.01)

(58) Field of Classification Search
CPC ....................................... G06Q 30/0207–0277
USPC .......................................................... 726/26
See application file for complete search history.

(56) References Cited

U.S. PATENT DOCUMENTS

| | | | | |
|---|---|---|---|---|
| 5,937,414 A * | 8/1999 | Souder et al. | | 707/616 |
| 7,032,090 B2 * | 4/2006 | Hulsey | | 711/162 |
| 7,167,963 B2 * | 1/2007 | Hirakawa et al. | | 711/162 |
| 7,346,751 B2 * | 3/2008 | Prahlad et al. | | 711/162 |
| 7,509,468 B1 * | 3/2009 | Dalal et al. | | 711/163 |
| 7,603,395 B1 * | 10/2009 | Bingham et al. | | |
| 7,640,388 B2 * | 12/2009 | Nakashima | G06F 11/1435 | 711/103 |
| 7,949,841 B2 * | 5/2011 | Pattabiraman et al. | | 711/162 |
| 2004/0250030 A1 * | 12/2004 | Ji et al. | | 711/162 |
| 2005/0038968 A1 * | 2/2005 | Iwamura et al. | | 711/162 |
| 2005/0182910 A1 * | 8/2005 | Stager et al. | | 711/162 |
| 2005/0243609 A1 * | 11/2005 | Yang et al. | | 365/189.05 |
| 2006/0139697 A1 * | 6/2006 | Fuente | G06F 3/0611 | 358/296 |
| 2006/0288178 A1 * | 12/2006 | Yagawa et al. | | 711/162 |
| 2006/0288183 A1 * | 12/2006 | Boaz et al. | | 711/164 |
| 2007/0005917 A1 * | 1/2007 | Morishita et al. | | 711/162 |
| 2007/0028067 A1 * | 2/2007 | Hinrichs | G06F 21/78 | 711/164 |
| 2007/0067584 A1 * | 3/2007 | Muto | | 711/162 |
| 2007/0073986 A1 * | 3/2007 | Ninose et al. | | 711/162 |
| 2007/0294314 A1 * | 12/2007 | Padovano et al. | | 707/201 |

OTHER PUBLICATIONS

White, Ron, "How Computers Work", Millennium Ed., Que Corporation, Indianapolis, IN, 1999.*

* cited by examiner

*Primary Examiner* — Chrystina E Zelaskiewicz

(74) *Attorney, Agent, or Firm* — Zilka-Kotab, P.C.

(57) ABSTRACT

A system, method and computer program product for performing a data protection operation is provided. The method includes receiving a write instruction that is associated with a writable entity, the write instruction includes a writable entity identifier, and data protection metadata indicative of a relevancy of at least one data protection operation to be applied in relation to the write instruction, and participating in an execution of a relevant data protection operation, if such a relevant data protection operation exists.

25 Claims, 5 Drawing Sheets

SYSTEM, METHOD AND COMPUTER PROGRAM PRODUCT FOR PERFORMING A DATA PROTECTION OPERATION

FIELD OF THE INVENTION

The present invention relates to methods, systems and computer program products for performing data protection operations, and more particularly, to a system and method for performing a data protection operation.

BACKGROUND OF THE INVENTION

The importance of data has increased during the last decade while the cost of data storage medium has decreased, thus motivating data storage vendors to provide data protection schemes that are based upon duplication of data.

Various prior art method and systems define mapping between address ranges and data protection operations. When information is written to a target address the applicable data protection scheme is determined only by that target address. For example, a certain volume can be defined as asynchronously mirrored, and incoming writes to this volume are recorded in some manner and later transferred to a secondary site.

This mapping does not necessarily address dynamically changing needs and storage limitations.

There is a growing need to provide a dynamic system, method and computer program product for data protection.

SUMMARY OF THE PRESENT INVENTION

A method, computer program product and storage system for performing a data protection operation, the method includes: receiving a write instruction that is associated with a writable entity; wherein the write instruction includes: a writable entity identifier; and data protection metadata indicative of a relevancy of at least one data protection operation to be applied in relation to the write instruction; and participating in an execution of a relevant data protection operation, if such a relevant data protection operation exists.

The write instruction comprises relevancy metadata indicative of a relevancy of the data protection metadata to at least one other write instruction that is associated with the writable entity.

The method includes: receiving a first write instruction that comprises a default indication and data protection metadata; receiving a second write instruction that lacks data protection metadata; wherein the first and second write instructions are associated with the writable entity; and determining a relevancy of at least one data protection operation to be applied in relation to the second write operation in response to the data protection metadata of the first write instruction.

The data protection metadata is indicative of a relevancy of at least one copy service operation. The data protection metadata is indicative of a relevancy of at least one copy service operation selected out of a group consisting of: change recording; in-order asynchronous remote copying; out-of-order asynchronous remote copying; and synchronous remote copying. The data protection metadata comprises a bitmap; wherein different bits of the bitmap are indicative of a relevancy of data protection operations of different types. The data protection metadata is indicative of at least one continuous data protection operation.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

Figure 1:
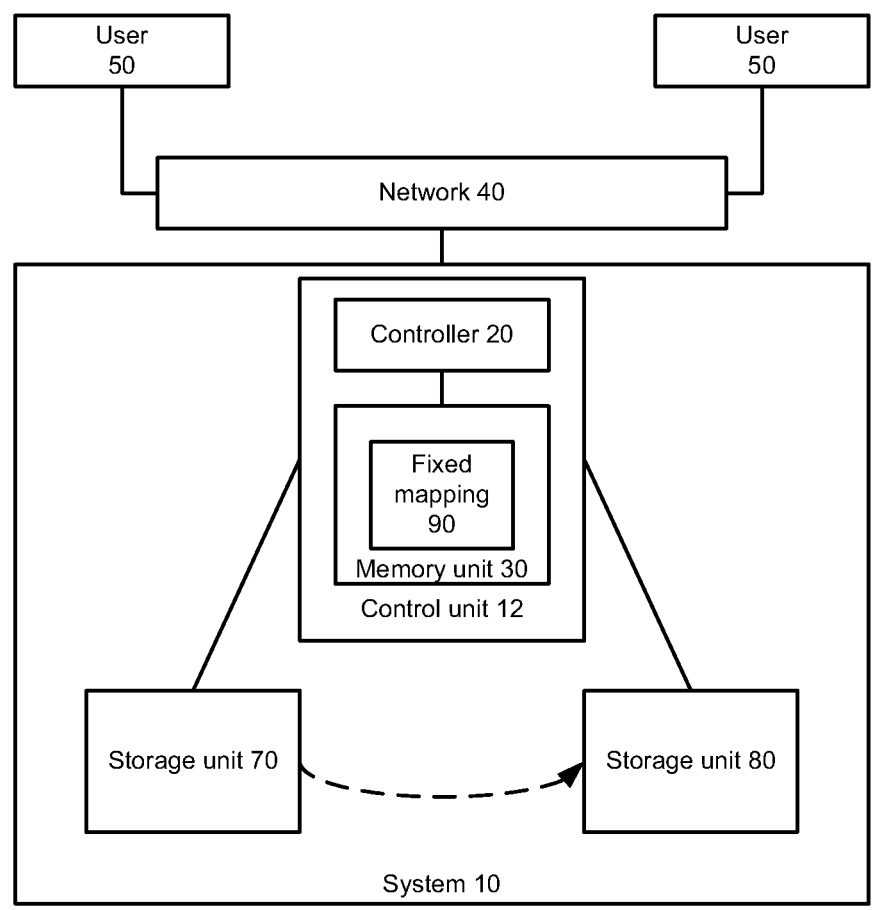
FIG. 1 illustrates a storage system and its environment, according to an embodiment of the invention.

Methods, systems and computer program products for performing a data protection operation are provided. The method, systems and computer product programs provided herein are not bound to a fixed mapping between target addresses and data protection operations. Metadata such as data protection metadata can be associated with one or more write instructions and can determine which data protection operation to execute. This metadata can be changed over time thus facilitating a dynamically changing data protection scheme.

The data protection metadata can be indicative of a relevancy of at least one copy service operation, can be indicative of a relevancy of a change recording, can be indicative of an in-order asynchronous remote copying, can be indicative of an out-of-order asynchronous remote copying, can be indicative of a synchronous remote copying, can be indicative of at least one continuous data protection operation or a combination thereof.

The data protection metadata can include a bitmap but this is not necessarily so. The data protection metadata can be encoded but this is not necessarily so. The data protection metadata can indicate that a combination of data protection operations should be executed. The bit map can indicate which data protection operations should be executed.

Using data protection metadata may enable a better utilization of the data protection schemes, to match the data protection scheme to the information that is written and to match the data protection scheme to various storage system constraints.

By using data protection metadata only a portion of a larger memory volume can be associated with a more resource-consuming data protection scheme while other portions can be protected by other (less resource consuming) data protection schemes. In addition, information units that can be protected by different data protection schemes can be stored at the same location or in proximate locations.

For example, different write operations of different information types to the same track can be followed by a synchronous mirroring, by an asynchronous mirroring, by a continuous data protection operation (so as to enable retrieval of information as it was at certain points in time) or should not be followed by any data protection operation. The first write operation can involve writing critical business information, the second write information can involve writing low importance information and the fourth write operation can involve writing information that can be re-built in a case of loss, even without applying a data protection operation. In order to facilitate such dynamically changing data protection schemes, the data protection metadata of the first, second, third and fourth write instructions can represent these data protection operations.

It is noted that a fixed mapping between addresses and data protection schemes can be used as a default, whereas in case of a conflict with the fixed mapping and data protection metadata the mapping the data protection metadata prevails.

Storage systems can execute one or more data protection schemes. A data protection scheme can be implemented by executing one or more data protection operations. These one or more data protection operations can include any operation (or operations) that can assist in restoring information. It can include copy operations, data transfer, encoding operations and the like.

For example, the different data protection schemes can include at least one of the following: change recording; in-order asynchronous remote copying; out-of-order asynchronous remote copying; synchronous remote copying; or continuous data protection. The first four data protection schemes are also referred to as copy services. Change recording can involve updating a data structure whenever a writeable entity (such as a track) is updated. It is noted that a write operation can be followed by a combination of at least one of the mentioned above data protection operations.

A storage system controller can intercept a write instruction that is sent to it from a user, determine which (if any) data protection operation to execute, and participate in such a data protection operation. For example, an incoming write instruction to a volume that was defined as a primary in a remote copy relation, will be checked in order to determine whether to initiate the synchronous remote copy operation, asynchronous in-order operation, or asynchronous out-of-order remote copy operation. This can involve modifying the controller code to enable such a determination.

According to an embodiment of the invention a write instruction can include metadata (such as relevancy metadata) that indicates that data protection metadata included in a certain write instruction should determine the data protection operations to be executed after other write instructions. For example, a write instruction can include relevancy metadata that determines the data protection operations (if any) to be executed in relation to subsequent write operations that are associated with the same writable entity. These subsequent write instructions can lack data protection metadata. The relevancy metadata can indicate the number of subsequent write operations that should be affected by the certain write instruction.

Write instructions that lack data protection metadata can be generated by users that are typically not aware of the data protection schemes. Write instructions that include data protection metadata can be generated by a storage system administrator, by a database administrator, or by a "root" that creates a file (or other application object) and specifies the data protection scheme that should be applied. The data protection scheme can be set persistent.

FIG. 1 illustrates system 10 and its environment. System 10 includes control unit 12 and storage units 70 and 80. Control unit 12 includes memory unit 30 and controller 20. Memory unit 30 can store write instructions and information. FIG. 1 illustrates memory unit 30 as storing fixed mapping database 90 that maps addresses and data storage operations. Fixed mapping database 90 is optional. It can be used whenever a write operation is not associated (directly or indirectly) with data protection metadata.

Control unit 12 is connected to users 50 via network 40. It is noted that the number of users can exceed two and typically well exceeds two. It is further noted that network 40 can be connected to various types of users and that it can be connected to a database administrator.

User 50 can generate a write instruction that is sent via network 40 to control unit 12. Control unit 12 and especially controller 20 checks whether the write instruction should be followed by one or more data protection operations.

Figure 2:
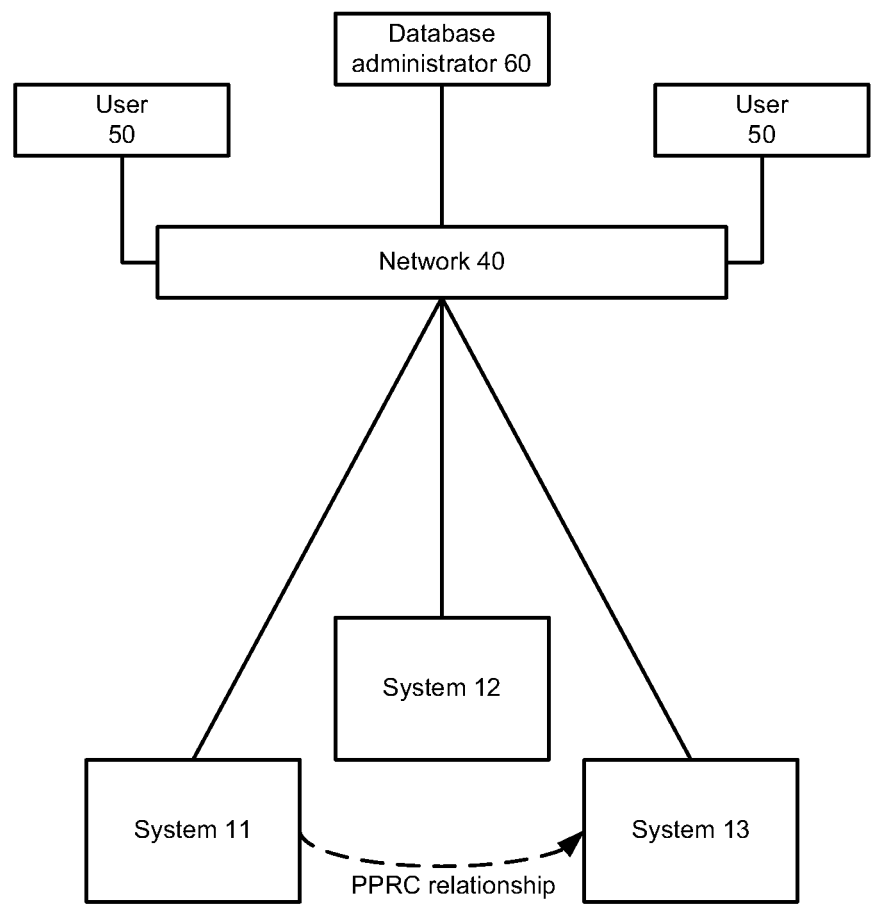
FIG. 2 illustrates storage systems and their environment, according to an embodiment of the invention.

FIG. 2 illustrates systems 11, 12, 13 and their environment. Systems 11, 12 and 13 are connected to database administrator 60 and users 50 via network 40. Each system out of systems 11, 12 and 13 can be equivalent to system 10 of FIG. 1. Each includes a control unit and storage units, wherein the control unit includes a memory unit and a controller. Systems 11, 12 and 13 can facilitate various data protection schemes. For example, a peer to peer remote copy relationship (PPRC) is established between systems 11 and 13. Users 50 and database administrator 60 can send write instructions to these systems.

FIGS. 3a-3d illustrate write instructions 101, 102, 103 and 104 according to various embodiments of the invention.

Figure 3A:
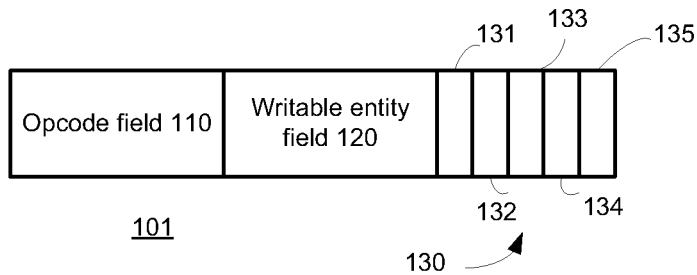
FIG. 3a-3d illustrate write instructions according to various embodiments of the invention.

Write instruction 101 of FIG. 3a includes various fields such as write instruction opcode field 110, writeable entity field 120 and data protection metadata field 130.

FIG. 3a illustrates data protection metadata field 130 as a bit map that includes five bits: change recording bit 131, in-order asynchronous remote copying bit 132, out-of-order asynchronous remote copying bit 133, synchronous remote copying bit 134 and continuous data protection bit 135. The relevancy of a data protection operation (change recording, in-order asynchronous remote copying, out-of-order asynchronous remote copying, synchronous remote copying bit or continuous data protection) is indicated by the value of its corresponding bit.

Figure 3B:
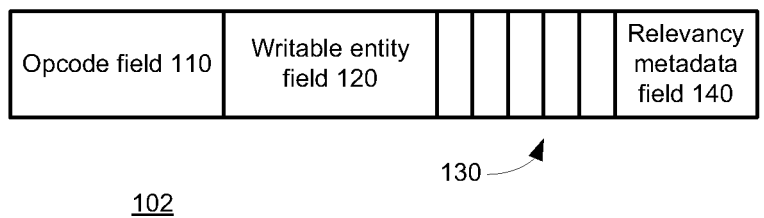

Write instruction 102 of FIG. 3b includes the fields of write instruction 101 as well as a relevancy metadata field 140. A relevancy metadata is indicative of a relevancy of the data protection metadata to at least one other write instruction that is associated with the same writable entity.

Figure 3C:
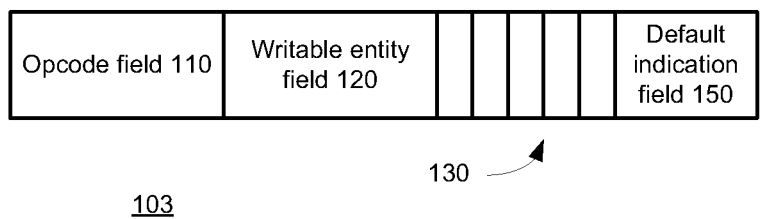

Write instruction 103 of FIG. 3c includes the fields of write instruction 101 as well as a default indication field 150. A default indication indicates that data protection metadata included in field 130 can be used as a default data protection metadata.

Figure 3D:
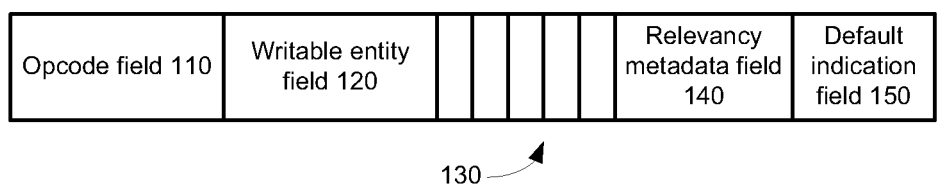

Write instruction 104 of FIG. 3d includes the fields of write instruction 101 as well as a relevancy metadata field 140 and a default indication field 150.

Figure 4:
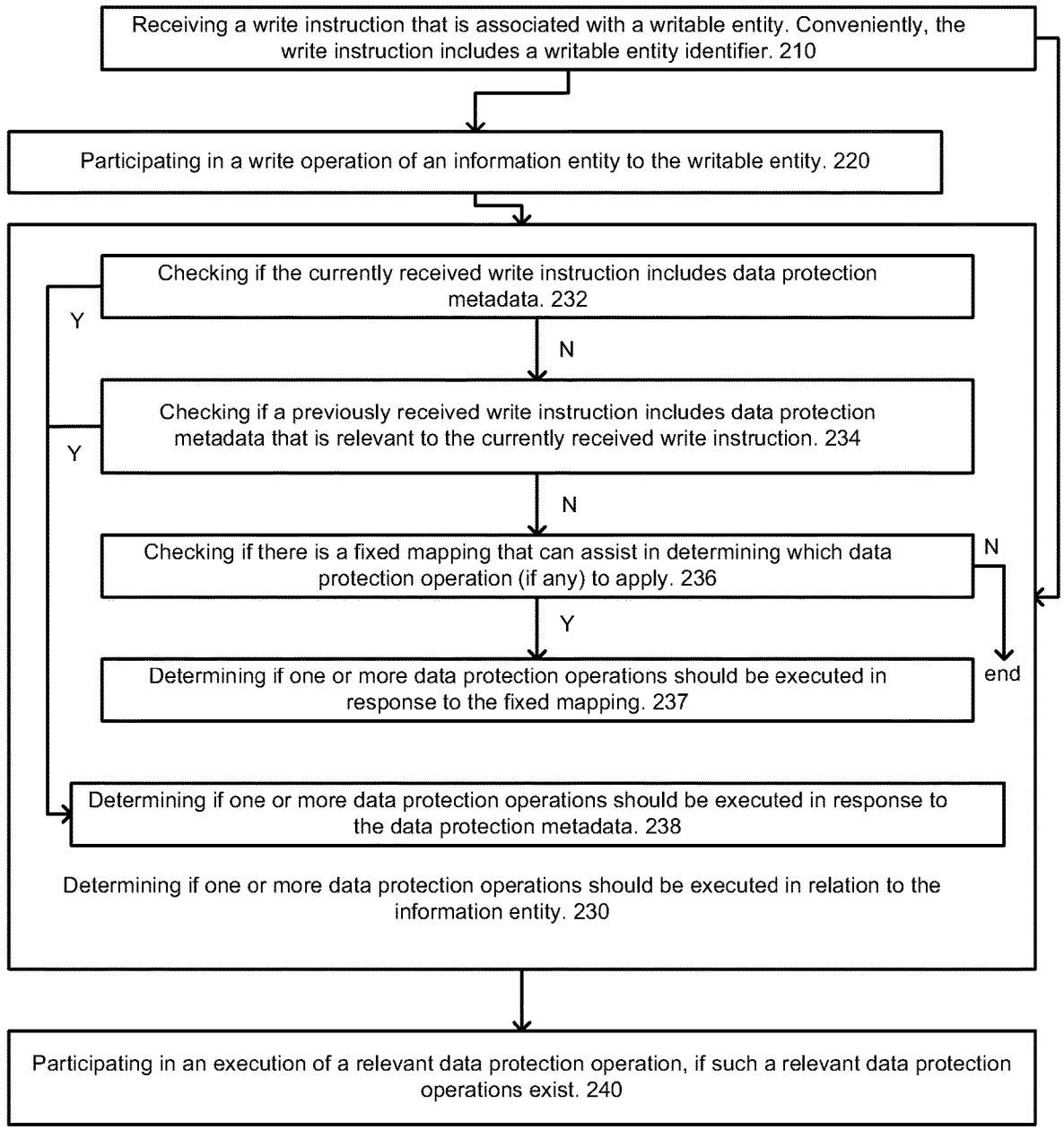
FIG. 4 illustrates a method for performing a data protection operation, according to an embodiment of the invention.

FIG. 4 illustrates method 200 for performing a data protection operation according to an embodiment of the invention.

Method 200 starts by stage 210 of receiving a write instruction that is associated with a writable entity. Conveniently, the write instruction includes a writable entity identifier. The write instruction is also referred to as a currently received write instruction. The writable entity can be a physical address, a physical range of addresses, a virtual address, a virtual range of addresses or a combination thereof. It can be, for example, a track, a volume and the like. The writable entity can be an application object such as a file, a database and the like. The write instruction includes writing information to the writable entity.

Stage 210 is followed by stage 220 and stage 230.

Stage 220 includes participating in a write operation of an information entity to the writable entity. The participation can include, for example, initiating the write operation, controlling the write operation or otherwise taking at least a part in the execution of the write operation.

Stage 230 includes determining if one or more data protection operations should be executed in relation to the information entity. Such a data protection operation is referred to as a relevant data protection operation.

The determination can be responsive to data protection metadata that is included in the currently received write instruction. If such data protection metadata is not included in the received write instruction the determination can be responsive to data protection metadata included in a previously received write instruction. If even such data protection metadata does not exist (or is not relevant to the currently received write instruction) then the determination can either result in not performing any data protection operation or performing a data protection operation according to a fixed mapping between data protection operations and addresses.

Accordingly, stage 230 can start by stage 232 of checking if the write instruction includes data protection metadata. The data protection metadata is indicative of a relevancy of at least one data protection operation to be applied in relation to the write instruction.

If the answer is positive then stage 232 is followed by stage 238 of determining if one or more data protection operations should be executed in response to the data protection metadata. In this case stage 238 is responsive to the data protection metadata included in the currently received write instruction.

If the answer is negative (the currently received write instruction does not include data protection metadata) then stage 232 is followed by stage 234 of checking if a previously received write instruction includes data protection metadata that is relevant to the currently received write instruction.

It is noted that the relevancy of a previously received write instruction can be learnt from relevancy metadata included in the previously received write instruction or from a default indication included in the previously received write instruction. The previously received write instruction can include relevancy metadata indicative of a relevancy of the data protection metadata to at least one other write instruction that is associated with the same writable entity. The previously received write instruction can include a default indication that indicates that the data protection metadata included in the previously received write instruction can be used as a default data protection metadata.

If the answer is positive then stage 234 is followed by stage 238. In this case stage 238 is responsive to the data protection metadata included in a previously received write instruction.

If the answer is negative (there is no relevant data protection metadata) then stage 234 is followed by stage 236 of checking if there is a fixed mapping that can assist in determining which data protection operation (if any) to apply.

If the answer is positive then stage 236 is followed by stage 237 of determining if one or more data protection operations should be executed in response to the fixed mapping.

If the answer is negative (there is no relevant data protection metadata and there is no fixed mapping) then stage 236 can be followed by determining not to apply any data protection operation.

Stage 230 is followed by stage 240 of participating in an execution of a relevant data protection operation, if such a relevant data protection operations exist. The participation can include, for example, initiating a relevant data protection operation, controlling the execution of the relevant data protection operation or otherwise taking at least a part in the execution of the relevant data protection operation.

It is noted that using the default indication can result in the following sequence of stages: (i) receiving (during an iteration of stage 210) a first write instruction that includes a default indication and data protection metadata; (ii) executing some other stages of method 200; (iii) receiving (during another iteration of method 200) a second write instruction that lacks data protection metadata; wherein the first and second write instructions are associated with the writable entity; and (iv) determining (during an iteration of stage 230) a relevancy of at least one data protection operation to be applied in relation to the second write operation in response to the data protection metadata of the first write instruction.

According to another embodiment of the invention a method can be provided for generating a write instruction. The write instruction is associated with a writable entity and it includes a writable entity identifier; and data protection metadata indicative of a relevancy of at least one data protection operation to be applied in relation to the write instruction. It can also include a default identifier, and additionally or alternatively relevancy metadata.

Furthermore, the invention can take the form of a computer program product accessible from a tangible computer-usable or a tangible computer-readable medium providing program code for use by or in connection with a computer or any instruction execution system. For the purposes of this description, a tangible computer-usable or a tangible computer readable medium can be any tangible apparatus that can contain, store, communicate, propagate, or transport the program for use by or in connection with the instruction execution system, apparatus, or device.

The tangible medium can be read by applying various methods and techniques such as but not limited to electronic, magnetic, optical, electromagnetic or infrared based techniques. The tangible medium can be a semiconductor system but can be made from other materials, especially those materials that can be read by the mentioned above techniques. Non limiting examples of a tangible computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 5:
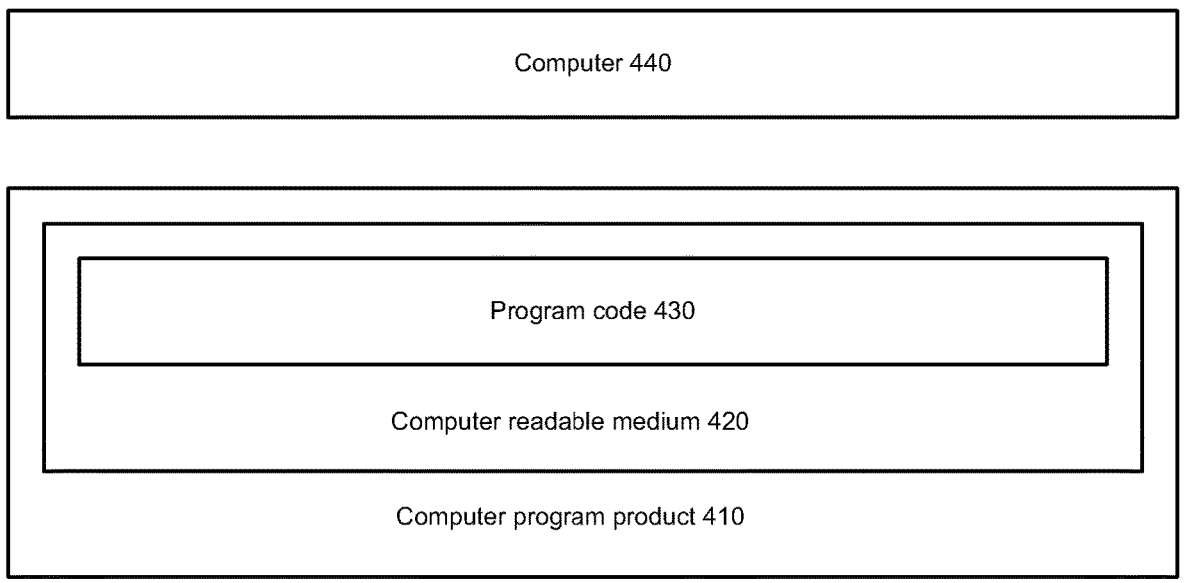
FIG. 5 illustrates a system, according to an embodiment of the invention.

FIG. 5 illustrates computer program product 410 according to an embodiment of the invention.

Computer program product 410 includes tangible computer-usable or a tangible computer-readable medium 420 providing program code 430 for use by or in connection with a computer such as computer 440 or any instruction execution system such as system 10 of FIG. 1. Computer 440 can be a controller such as controller 20 of FIG. 1.

Program code 430 (also referred to as computer readable program), when executed on computer 440 causes computer 440 to: (i) receive a write instruction that is associated with a writable entity; wherein the write instruction includes: a writable entity identifier; and data protection metadata indicative of a relevancy of at least one data protection operation to be applied in relation to the write instruction; and (ii) participate in an execution of a relevant data protection operation, if such a relevant data protection operation exists.

Variations, modifications, and other implementations of what is described herein will occur to those of ordinary skill in the art without departing from the spirit and the scope of the invention as claimed.

Accordingly, the invention is to be defined not by the preceding illustrative description but instead by the spirit and scope of the following claims.

We claim:

1. A computer-implemented method for performing a data protection operation, the method comprising:
   receiving at a controller a write instruction that is associated with a writable entity; wherein the write instruction comprises:
      a writable entity identifier; and
      data protection metadata indicative of a relevancy of at least one data protection operation to be applied in relation to the write instruction; and
   participating, by the controller, in a write operation, the write operation comprising writing an information entity to the writable entity specified by the writable entity identifier;
   determining whether the at least one data protection operation is relevant to either or both of:
      the write instruction; and
      at least one other write instruction; and
   participating, by the controller, in an execution of the at least one data protection operation in response to determining the at least one data protection operation is relevant to either or both of the write instruction and the at least one other write instruction; and
   wherein the at least one data protection operation comprises a separate action distinct from the write operation.

2. The method according to claim 1 wherein the write instruction further comprises relevancy metadata, the relevancy metadata being indicative of a relevancy of the data protection metadata to the at least one other write instruction; and
   wherein the at least one other write instruction is associated with the writable entity.

3. The method according to claim 1, wherein the data protection metadata comprises a plurality of bits, each bit indicating whether to apply one of the at least one data protection operation to the write instruction or the at least one other write instruction; and
   wherein determining whether the at least one data protection operation is relevant to the write instruction comprises determining a value of each of the plurality of bits.

4. The method according to claim 3, wherein each bit of the data protection metadata is indicative of a relevancy of a particular type of data protection operation selected out of a group consisting of:
   change recording;
   in-order asynchronous remote copying;
   out-of-order asynchronous remote copying;
   synchronous remote copying; and
   continuous data protection.

5. The method according to claim 4, wherein the data protection metadata comprises a bitmap.

6. The method according to claim 3, wherein determining whether the at least one data protection operation is relevant to the at least one other write instruction comprises:
   evaluating a relevancy metadata field of the write instruction;
   in response to determining the relevancy metadata field indicates some or all of the data protection operations are relevant to the other write instruction(s), determining which of the other write instruction(s) relate to the writable entity; and
   participating in the data protection operation(s) relevant to the other write instruction(s) that relate to the writable entity; and
   wherein the at least one other write instruction lacks data protection metadata.

7. The method according to claim 1 wherein the writable entity is either an application object or a memory space.

8. The method according to claim 1 wherein the write instruction further comprises a default indication field indicative of applicability of a default data protection operation relevant to other write instructions lacking data protection metadata.

9. A computer program product comprising a non-transitory computer usable medium including a computer readable program, wherein the computer readable program when executed on a computer causes the computer to:
   receive a write instruction that is associated with a writable entity;
   participate in a write operation specified by the write instruction; and
   in response to determining one or more data protection operations are relevant to the write operation, participate in an execution of the one or more data protection operations;
   wherein the write instruction comprises:
   a writable entity identifier; and
   data protection metadata indicative of a relevancy of each of the one or more data protection operations in relation to the write instruction; and
   wherein determining whether the one or more data protection operations are relevant to the write operation is based on the data protection metadata.

10. The computer program product according to claim 9 wherein the write instruction comprises relevancy metadata indicative of a relevancy of the data protection metadata to at least one other write instruction that is associated with the writable entity.

11. The computer program product according to claim 9, wherein the write instruction further comprises a default indication field indicative of applicability of a default data protection operation relevant to other write instructions lacking data protection metadata.

12. The computer program product according to claim 9 wherein the data protection metadata is indicative of a relevancy of at least one copy service operation.

13. The computer program product according to claim 9, wherein the data protection metadata is indicative of a relevancy of at least one data protection operation selected out of a group consisting of:
  continuous data protection;
  change recording;
  in-order asynchronous remote copying;
  out-of-order asynchronous remote copying; and
  synchronous remote copying.

14. The computer program product according to claim 9, wherein the data protection metadata comprises a bitmap; wherein different bits of the bitmap are indicative of a relevancy of data protection operations of different types selected out of a group consisting of:
  continuous data protection;
  change recording;
  in-order asynchronous remote copying;
  out-of-order asynchronous remote copying; and
  synchronous remote copying.

15. The computer program product according to claim 9 wherein the data protection metadata is indicative of either or both of: at least one continuous data protection operation; and at least one copy service operation.

16. The computer program product according to claim 9, wherein the write instruction further comprises relevancy metadata indicative of a relevancy of the one or more data protection operations to one or more subsequent write instructions.

17. The computer program product according to claim 9, wherein the writable entity is either a memory space or an application object.

18. The computer program product according to claim 9, wherein the write instruction specifies writing information of a first type to a track of the writable entity;
  wherein a second write instruction specifies writing information of a second type to the track;
  wherein the information of the first type is more important that the information of the second type;
  wherein the one or more data protection operations relevant to the write operation comprise continuous data protection of the track to enable retrieval of the information of the first type at multiple points in time; and
  wherein a data protection operation relevant to the second write instruction comprises asynchronous mirroring of the track to another writable entity.

19. A storage system comprising:
  a memory unit comprising a write instruction that is associated with a writable entity; wherein the write instruction comprises:
    a writable entity identifier; and
    data protection metadata indicative of a relevancy of at least one data protection operation to be applied in relation to the write instruction; and
  a controller, communicatively coupled to the memory unit and the writable entity to participate in an execution of:
    a write operation specifying an information entity to be written to the writable entity indicated by the writable entity identifier of the write instruction; and
    the at least one data protection operation, in response to determining, based on the data protection metadata, the at least one data protection operation is relevant to the write instruction.

20. The storage system according to claim 19 wherein the write instruction comprises relevancy metadata indicative of a relevancy of the data protection metadata to at least one other write instruction that is associated with the writable entity;
  wherein the memory unit is adapted to store a first write instruction that comprises a default indication and data protection metadata and to a second write instruction that lacks data protection metadata; wherein the first and second write instructions are associated with the writable entity;
  wherein the controller is adapted to determine a relevancy of at least one data protection operation to be applied in relation to the second write instruction in response to the data protection metadata of the first write instruction;
  wherein the data protection metadata is indicative of at least one continuous data protection operation; and
  wherein the data protection metadata is indicative of a relevancy of at least one copy service operation.

21. The method according to claim 1, comprising:
  associating a portion of a memory volume with a data protection scheme characterized by high resource consumption; and
  associating a second portion of the memory volume with a second data protection scheme characterized by less resource consumption than the data protection scheme.

22. The method according to claim 1, wherein participating in the execution of the relevant data protection operation, if such the relevant data protection operation exists, and wherein not participating in the execution of the relevant data protection operation, if such the relevant data protection operation does not exist, reduces resource consumption associated with data protection within a data storage system to which the write instruction applies.

23. The method of claim 1, wherein the data protection metadata indicate a plurality of the data protection operation(s) to be applied to the write instruction; and the method comprising participating in an execution of each of the plurality of data protection operation(s) with respect to the write instruction.

24. The method of claim 1, wherein the data protection metadata are encoded.

25. The method according to claim 1, wherein the write instruction comprises:
  a data protection metadata field comprising the data protection metadata;
  a relevancy metadata field comprising relevancy metadata; and
  a default indication field comprising a default indicator;
  wherein determining whether the at least one data protection operation is relevant to the write instruction is based on the data protection metadata; and
  wherein determining whether the at least one data protection operation is relevant to the at least one other write instruction is based on:
    the data protection metadata; and
    either or both of the relevancy metadata and the default indicator.

* * * * *